(12) United States Patent
Mo et al.

(10) Patent No.: US 10,736,335 B2
(45) Date of Patent: Aug. 11, 2020

(54) CHEWING GUM COMPOSITIONS BASED ON DRIED FRUIT POWDERS

(71) Applicant: WM. WRIGLEY JR. COMPANY, Chicago, IL (US)

(72) Inventors: Xiaoqun Mo, Oak Park, IL (US); David R. Phillips, Chicago, IL (US); Xiaohu Xia, Evanston, IL (US); Philip Shepherd, Glenview, IL (US)

(73) Assignee: WM. WRIGLEY JR. COMPANY, Chicago, IL (US)

( * ) Notice: Subject to any disclaimer, the term of this patent is extended or adjusted under 35 U.S.C. 154(b) by 472 days.

(21) Appl. No.: 14/358,254

(22) PCT Filed: Nov. 15, 2012

(86) PCT No.: PCT/US2012/065238
§ 371 (c)(1),
(2) Date: May 15, 2014

(87) PCT Pub. No.: WO2013/074762
PCT Pub. Date: May 23, 2013

(65) Prior Publication Data
US 2014/0308394 A1 Oct. 16, 2014

Related U.S. Application Data

(60) Provisional application No. 61/560,927, filed on Nov. 17, 2011.

(51) Int. Cl.
*A23G 4/06* (2006.01)

(52) U.S. Cl.
CPC .................. *A23G 4/068* (2013.01)

(58) Field of Classification Search
CPC .................................................. A23G 4/068
See application file for complete search history.

(56) References Cited

U.S. PATENT DOCUMENTS

| | | | | |
|---|---|---|---|---|
| 1,915,911 A * | 6/1933 | Allen | ........... | A23L 19/01 426/473 |
| 3,632,358 A | 1/1972 | Echandia et al. | | |
| 4,382,963 A * | 5/1983 | Klose | ........... | A23G 4/06 426/3 |
| 5,320,854 A * | 6/1994 | Dave | ........... | A23G 4/02 426/3 |
| 5,334,397 A | 8/1994 | Ream et al. | | |
| 5,344,659 A * | 9/1994 | Kurihara | ........... | A23G 4/068 426/3 |
| 6,056,949 A * | 5/2000 | Menzi | ........... | A61Q 11/00 424/461 |
| 6,787,167 B1 | 9/2004 | Stahl | | |
| 2002/0182270 A1 * | 12/2002 | Stier | ........... | A61K 36/185 424/725 |
| 2003/0049335 A1 * | 3/2003 | Stier | ........... | A61K 36/185 424/725 |
| 2003/0170365 A1 * | 9/2003 | Huang | ........... | A23L 27/34 426/548 |
| 2004/0022914 A1 * | 2/2004 | Allen | ........... | A23L 33/105 426/548 |
| 2008/0044539 A1 * | 2/2008 | Perlman | ........... | A23L 2/02 426/542 |
| 2008/0299250 A1 * | 12/2008 | Porsgaard | ........... | A23G 4/06 426/5 |
| 2009/0304857 A1 | 12/2009 | Neergaard | | |
| 2011/0262612 A1 * | 10/2011 | Gotz | ........... | A21D 2/38 426/583 |

FOREIGN PATENT DOCUMENTS

| | | | |
|---|---|---|---|
| CN | 102090586 A | 6/2011 | |
| EP | 0066864 B1 | 5/1986 | |
| WO | WO 9500038 A1 * | 1/1995 | .............. A23G 4/08 |
| WO | WO2007030011 A2 | 3/2001 | |
| WO | 2003103415 | 12/2003 | |
| WO | WO2004068964 A1 | 8/2004 | |
| WO | WO2007076857 A1 | 7/2007 | |
| WO | WO 2012014440 A1 * | 2/2012 | .............. A23G 4/025 |

OTHER PUBLICATIONS

Knudson, M. 2005. "Black Chokeberry" Plant Guide. USDA-NRCS.*
Frugal village Dehydrated Fruit Powder. 2009. Downloaded Sep. 19, 2017 from http://www.frugalvillage.com/forums/oamc-homecanning-freezing-preserving/123982-dehydrated-fruit-powder. html. 2 pages.*
Gianni. 2011. "Are There Any Good Natural Sweeteners? Renegade Health Exclusive Article." Downloaded Sep. 19, 2017, from http://renegadehealth.com/blog/2011/08/15/are-there-any-good-natural-sweeteners.*
Bolling, B.W., Taheri, R., Pei, R., Kranz, S., Yu, M., Durocher, S.N., Brand, M.H. 2015. "Harvest date affects aronia juice polyphenols, sugars, and antioxidant activity, but not anthocyanin stability." Food Chem. vol. 187, pp. 189-196.*
Anonymous, Erythritol, www.erythritol.com, Jan. 1, 2010, 2 pages, N/A.
Mintel, Banana Flavour Soft Bubble Gum, www.gnpd.com, Apr. 1, 2011, 2 pages, Accession No. 1536424.
Mintel, Gum (Orange and Lemon), www.gnpd.com, Oct. 1, 2010, 2 pages, Accession No. 1426465.
Mintel, Gum (Smart Pod), www.gnpd.com, Jan. 1, 2010, 2 pages, Accession No. 1434114.
Mintel, Strawberry Gum, www.gnpd.com, Jan. 1, 2011, 2 pages, Accession No. 1654229.

* cited by examiner

*Primary Examiner* — Nikki H. Dees

(57) ABSTRACT

Dried fruit powders are used as a replacement for current bulking agents used in chewing gum, such as polyols or sucrose, thereby providing healthier chewing gum options to consumers with real fruit taste.

10 Claims, 3 Drawing Sheets

CHEWING GUM COMPOSITIONS BASED ON DRIED FRUIT POWDERS

PRIORITY DATA

The present patent application is a 371 of International Application Ser. No. PCT/US2012/065238 filed Nov. 15, 2012, which claims benefit from U.S. Ser. No. 61/560,927, filed Nov. 17, 2011, and incorporates all by reference therefrom as if entirely restated herein.

BACKGROUND OF THE INVENTION

This invention relates to chewing gum compositions containing dried fruit powder as a replacement to typical bulking agents such as sugar and other polyols.

While sugars such as sucrose and fructose are used in the confectionary industry and are natural sweetening agents, they provide energy (calories), but contain few other nutrients. Studies have indicated potential links between sugar consumption and health hazards, including obesity and tooth decay. The rise in obesity rates globally has heightened the importance of delivering healthy, natural, and low calorie solutions while maintaining taste and sweetness.

Polyols are a group of low-digestible carbohydrates derived from the hydrogenation of their sugar or syrup source (e.g., lactitol from lactose). Polyols (or sugar alcohols) serve as useful sugar replacers in a wide range of products as part of a sugar free diet. Sugar-free confections have been around for many years because they offer the public non-cariogenic product alternatives, since polyols are not readily converted to acids by bacteria in the mouth and, therefore, do not promote tooth decay.

For individuals suffering from certain health conditions such as diabetes, sugar-free options provide a safe alternative to sugar-based products. Polyols provide a reduction in caloric content, and do not cause sudden increases in blood sugar levels. Consumers are finding new ways to incorporate candy as part of a healthy, active lifestyle, however, the options for good-tasting, high-quality products traditionally have been few because of the limited availability of ingredients that could be used as bulk sugar substitutes or bulk sugar replacers.

With increasing consumer demand for low-calorie, sugar-free, or natural products without the negative attributes associated with sugar, and with increasing innovations in food technology, reduced-calorie products are expected to become more available. These products may assist consumers in maintaining good oral health, controlling or reducing weight, and reducing glycemic load.

Newer commercial technology in drying fruits provides more energy efficient freeze drying and large scale drum drying, making dried fruits more economical and readily available commercially. Chewing gums formulated with dried fruit powder as the bulking agent provide not only a real fruit taste, but also offer healthier options for consumers. The bulking agent is natural since it is fruit, and it contains the natural flavor, vitamins and nutrients that is inherent to the fruit itself. Further, removal of the traditional polyol-type bulking agents can eliminate gastrointestinal discomfort often experienced by some individuals, or in the event multiple chewing gum pieces are consumed.

SUMMARY OF THE INVENTION

Dried fruit powders are used as a replacement for current bulking agents used in chewing gum, such as polyols or sucrose, thereby providing healthier chewing gum options to consumers with real fruit taste.

DESCRIPTION OF THE INVENTION

Figure 1:
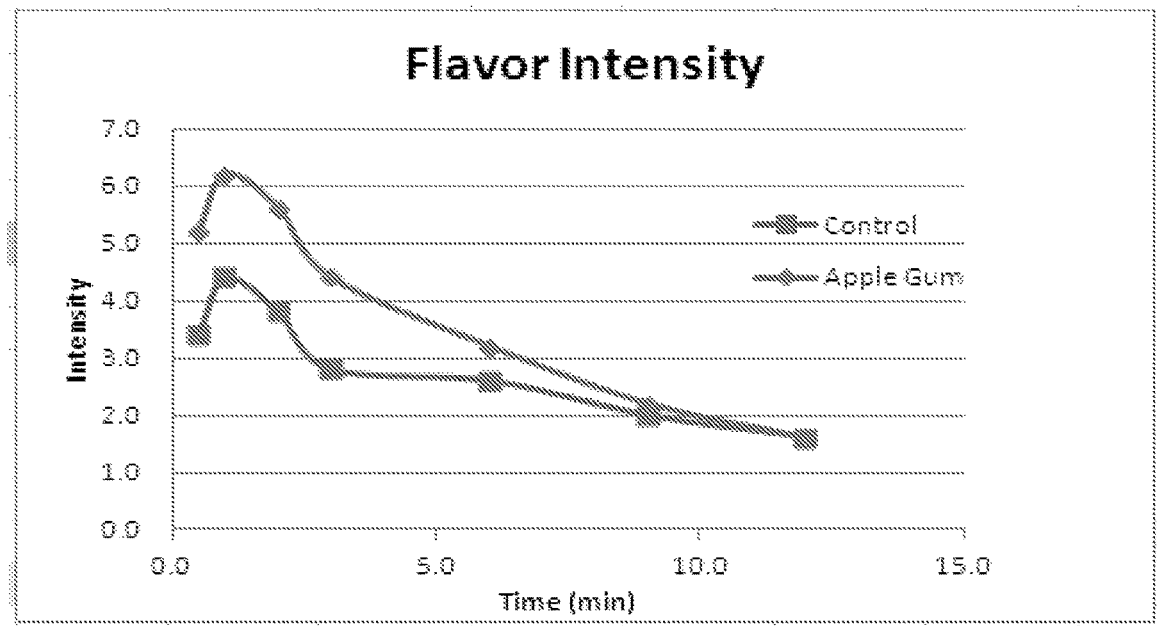
FIG. 1 is an illustration of the results from the flavor intensity of control vs. dried apple powder gum (100% of bulking agent).

As stated above, the present invention relates to chewing gums with dried fruit powder as the primary bulking agent to provide real fruit taste, and offer healthier options for consumers. Using dried fruit powder as the primary bulking agent provides a more natural chewing gum, since it is fruit, and therefore contains the natural flavor, vitamins and nutrients that are inherent to the fruit itself, even post processing. Further, removal of the traditional polyol-type bulking agents can eliminate gastrointestinal discomfort often experienced by some individuals, as well as the negative health issues often associated with sugar.

In general, chewing gums typically contain 50% or greater by weight of a sweet bulking agent. The bulking agent serves multiple purposes. For example, the sweet bulking agent provides substance, or bulk, to the gum so that the consumer perceives a substantive quantity of gum that is easy and enjoyable to chew in the first few minutes. Often, the sweet bulking agent delivers sweetness in the initial few minutes of chewing, which when augmented by the flavor present in the gum provides and enjoyable chewing experience to the consumer. Overall, the bulking properties of sucrose and sugar-free bulking agents contribute a pleasant mouth feel to the consumer as most gum bases are too firm to chew prior to hydration and warming to mouth temperature Often, the sweet bulk agent used in chewing gum is either sugar (sucrose) or sugar-free (polyols). Both sweet bulking agent types offer advantages and disadvantages.

In chewing gums, sucrose is a natural sweetener, providing mouthfeel and texture, while slowly releasing sweetness, and enhancing flavor delivery of the chewing gum composition. Unfortunately, sucrose is cariogenic, and may lead to dental caries (tooth decay) as well as impacting glucose levels for those suffering from diabetes. Chewing gums which use sugar as the primary bulking agent can be viewed negatively in that sugars such as sucrose have been recently described in the media and elsewhere as "empty calories". That is, providing calories without other nutritional benefits such as vitamins, fiber, etc.

In contrast, polyol based sweet bulking agents such as sorbitol, maltitol, isomalt, mannitol, and xylitol are often used in place of sugar in chewing gum compositions.

Sorbitol is commonly used due to availability and cost, while maltitol is used because of its similarity to sucrose in sweetness and solubility.

Polyols typically demonstrate a perception of sweetness from about 30% to about 70% that of sucrose to a consumer. For this reason, high intensity sweeteners are often added to give sweetness similar to that of sucrose. Because there is such a large demand by consumers for "natural" or at least "naturally-sweetened" chewing gums, usage of polyols as the main bulking agent often requires usage of unnatural, high intensity sweeteners to meet sweetness expectations, and can deter consumer purchase intent.

Another disadvantage to using polyols is causation of gastrointestinal disturbances (such as laxation) upon consumption. Typically, a material is considered not to cause gastrointestinal disturbances (e.g., non-laxative), if such material is either substantially absorbed before entering the large intestine or passes though the large intestine substantially unchanged, in the quantities present in chewing gum. The amount of gastrointestinal disturbance or laxation distress experienced by a consumer of a chewing gum typically depends on the sensitivity of the consumer, the specific polyol used in the gum, and the amount of gum chewed.

Considering the disadvantages associated with both sugar and sugar-free sweet bulking agents, there is a need for a sweet bulking agent suitable for use in chewing gum compositions, which is natural, provides a healthier chewing gum option to the public, and does not cause gastrointestinal disturbances in the amounts consumed in chewing gum.

The term "sweet bulking agent" includes bulking agents that are sweet or contribute sweetness to the chewing gum composition. As used herein, a "sugar" bulking agent is a sweet bulking agent, defined as a small molecule, typically with degree of polymerization of one or two saccharide units, and typically a caloric carbohydrate such as sucrose, dextrose, fructose, maltose, and most typically sucrose. As used herein, a "sugarfree" bulking agent is also a sweet bulking agent, typically including a hydrogenated low molecular weight saccharide, such as sorbitol, maltitol, xylitol, isomalt or mannitol.

Dried fruit powders are defined as fruit that has been dried to a low water content, typically containing less than 12% by weight, less than 9% by weight, and less than 6% by weight water.

As used herein, all percentages and ratios used are by weight of the total composition and all measurements made are at 25° C., unless otherwise designated.

"Fruit" is defined herein as including berries, drupes, pomes, compound, and accessory fruits. Berries are simple fruits having seeds and pulp produced from a single ovary; the ovary can be inferior or superior. Examples of berries include but are not limited to blackcurrant, redcurrant, gooseberry, guava, pomegranate, kiwifruit, grape, cranberry, blueberry, melon, orange, lemon, lime, and grapefruit. Drupes are fleshy fruits usually produced from a single-seeded ovary with a hard stony layer, called the endocarp, surrounding the seed. Examples of drupes include but are not limited to plums, peaches and cherries. The pome fruits produced by plants in subtribe Pyrinae from the Rosaceae family, have a structure (the core) that clearly separates the seeds from the ovary tissue. Examples of pomes include but are not limited to apples and pears; however, some of the smaller pomes are sometimes referred to as berries. Examples of compound fruits include but are not limited to blackberry, raspberry, boysenberry, pineapple, fig, mulberry, and hedge apple. Examples of accessory fruits include, but are not limited to apple, rose hip, and strawberry.

The fruit may be seeded or seedless. Commercial cultivars of bananas, pineapples and watermelon are examples of seedless fruits. In an aspect of the invention, 30% of a seedless dried fruit powder is provided by weight of a chewing gum composition.

A variety of drying methods may be employed to provide a dried fruit powder typically containing less than 12% by weight water. Some drying methods include, but are not limited to solar, spray, contact, foam, explosion puffing, vacuum, freeze, radiative, acoustic, and osmotic drying, alone or in any combination.

Currently, the process of freeze drying provides better dried fruit quality over other drying methods. Little or no shrinkage occurs to the fruit in the freeze drying process, yielding a dry product with a porous structure, and color reflective of the raw fruit itself. Two main stages in the freeze-drying process include (1) freezing of the fruit, when most of the water is converted into ice and (2) sublimation, when the bulk or all of the ice is transferred into vapor under very low pressure or high vacuum, and the vapor is removed in the dryer.

Other drying methods, such as spray drying, inject fruit slurry into a vessel that uses hot air to rapidly remove the water and create a fine powder of dried fruit. Since dried fruit powders are obtained by removing mostly water from fruit, the drying methods mentioned above generally yield fruit powders having a fruit concentration or purity of at least 85%, at least 90%, at least 95%, or at least 97% by weight. Dried fruit powders are commercially available for a variety of fruits, such as apple, strawberry, cranberry, blueberry, raspberry, blackberry, lemon, banana and mango. As seen in the examples of Table 1, water content is typically below 6% by weight of the dried fruit powder, and contains the nutritional benefits inherent to the native fruits, such as vitamins, fibers, carbohydrates and fruit sugars. In these examples, the amount of fiber, vitamins, protein, carbohydrates, etc., vary depending on fruit type.

TABLE 1

|  | Cranberry | Apple | Strawberry |
| --- | --- | --- | --- |
| Moisture | 3% | 3% | 3% |
| Carbohydrates | 86% | 93% | 80% |
| Protein | 3% | 0.9% | 7% |
| Fat | 5.6% | 1.9% | 4% |
| Fiber | 11.2% | 3.4% | 6% |
| Vitamin A | 320 IU per 100 g | 275 IU per 100 g | 311 IU per 100 g |
| Vitamin C | 88 mg per 100 g | 25 mg per 100 g | 625 mg per 100 g |

In an aspect of the invention, the dried fruit powder is produced from the process of cold spray drying, with an average particle size of about 0.5 mm to 1.4 mm. In another embodiment, the dried fruit powder is produced by freeze drying, and then milled to yield an average particle size of about 0.25-4.0 mm. Those skilled in the art would recognize that a variety of milling techniques and screens may be employed to achieve different particle size ranges of the dried fruit powders.

Preferably, the fruit powders of the present invention are small, and unnoticeable to consumers as separate particles in the finished gum matrix. For example, a particle size range of dried fruit powder that can be used to achieve this objective is 75% fruit powder through a US #12 mesh screen, 90% fruit powder through a US #12 mesh screen, or 100% fruit powder through a US #12 mesh screen.

Some manufacturers of dried fruit powders add other ingredients, such as maltodextrin, to reduce costs, improve handling, or provide other sensory benefits. Inclusion of such ingredients impact the concentration or purity of the dried fruit powder. As used herein, "concentration" is defined as the amount of a particular substance in a given amount of another substance. For example, dried fruit powder and fillers such as maltodextrin, are blended in various ratios such as 50% fruit powder and 50% maltodextrin by weight, or alternatively, 70% fruit powder and 30% maltodextrin by weight. In an embodiment, the dried fruit powder used in a chewing composition has a fruit concentration of at 30%, at least 50%, or at least 70% by weight of the mixture.

Applicants have tested a variety of dried fruit powders, and have found that they can fully or partially replace sugar and/or sugar-free sweet bulking agents.

Typical ranges of traditional sweet bulking agents such as sucrose or polyol ranges from 15% by weight to about 80% by weight in chewing gums. Thus, in replacing all of the sweet bulk agent present in a chewing gum composition, the dried fruit powder content range is about 15% by weight to about 80% by weight.

In an aspect of the invention, the bulking agent is replaced with dried fruit powder, and the ratio of dried fruit powder to bulking agent is typically in a ratio of 1:1, 1:2, or more typically 1:3 by weight.

In an embodiment, the dried fruit powder is present at about 15% by weight to about 30% by weight, from about 35% to about 50%, or from about 55% to about 70% by weight of the chewing gum composition. In yet another embodiment, the dried fruit powder is present at about 40% by weight to about 60% by weight of the chewing gum composition.

Examples of full (100%) replacement of the sweet bulk agent by weight are shown in Examples 1 and 2 of Table 2 below. A partial (50%) replacement of the sweet bulk agent by weight is shown in Example 3 of Table 2. The apple and strawberry powders in Table 2 were freeze dried and milled into powder. The apple powder was made from Granny smith apples. Both powders contain equal or less than 5% water content by weight, thus having a fruit concentration of at least 95% by weight of the fruit powder. Dried fruit powders are commercially available from a variety of suppliers.

TABLE 2

| Ingredient | Example 1 % | Example 2 % | Example 3 % |
|---|---|---|---|
| Apple Powder | 53.25 | — | — |
| Strawberry Powder | — | 44.5 | 22.25 |
| Sorbitol | — | — | 22.25 |
| Gum Base | 32.0 | 41.5 | 41.5 |
| Glycerin | 12.0 | 12.0 | 12.0 |
| Acid | 0.75 | — | — |
| High intensity sweetener | 1.0 | 1.0 | 1.0 |
| Apple Flavor | 1.0 | — | — |
| Strawberry Flavor | — | 1.0 | 1.0 |

In Example 1 above, the polyol bulking agent is replaced with 53.25% freeze dried apple powder. In the Example 2, 44.5% freeze dried strawberry powder is used along with a higher gum base level than the apple example. Example 3 shows the bulking agent consists of an equal blend of sorbitol and freeze dried strawberry powder, at 22.25% each.

As stated above, the typical bulking agent level in gum is about 15% to about 80% by weight of a chewing gum composition. Dried fruit powder can be used as a partial replacement of traditional bulking agents such as sucrose, polyol, or mixtures thereof. The fruit powder can be used to replace about 20% to about 100% by weight of the bulking agent, from about 30% to about 80% of the bulking agent, or from about 40% to about 60% by weight of the bulking agent.

Applicants tested a variety of different levels for replacing sweet bulking agent with dried apple fruit powder. The various sorbitol replacement levels of 100%, 84%, 55%, and 28% are shown below in Table 3.

TABLE 3

| Ingredient | Control | Example 4 100% Sorbitol Replacement | Example 5 84% Sorbitol Replacement | Example 6 55% Sorbitol Replacement | Example 7 28% Sorbitol Replacement |
|---|---|---|---|---|---|
| Sorbitol | 47.5 | — | — | 16.2 | 31.9 |
| Apple powder | — | 54.0 | 47.5 | 31.3 | 15.6 |
| Base | 32.0 | 32.0 | 32.0 | 32.0 | 32.0 |
| Sorbitol syrup | 9.1 | — | 9.1 | 9.1 | 9.1 |
| Glycerin | 9.4 | 12.0 | 9.4 | 9.4 | 9.4 |
| High Intensity Sweetener | 1.0 | 1.0 | 1.0 | 1.0 | 1.0 |
| Apple flavor | 1.0 | 1.0 | 1.0 | 1.0 | 1.0 |
| Total | 100.0 | 100.0 | 100.0 | 100.0 | 100.0 |

As mentioned above, some dried fruits and resultant fruit powders contain seeds, which may produce an undesirable mouthfeel due to the presence of the seeds in chewing gum compositions. Applicants made chewing gums with dried fruit powders containing seeds which made the gum too soft and flowing. To solve this problem, Applicants blended the dried fruit powders containing seeds with traditional bulking agents, including but not limiting to polyols, sugars, maltose, dextrin, dried invert sugar, fructose, levulose, galactose, corn syrup solids and the like. For example, strawberry dried fruit powder may be combined with sorbitol powder at a ratio of dried fruit powder to sweet bulking agent of about 10:90 to about 90:10 by weight, from about 30:70 to about 70:30 by weight, and typically from about 40:60 to about 60:40 by weight. Once blended, the fruit powder and bulk sweetener mixture is added to the chewing gum composition at about 15% or more by weight.

In an embodiment, a raspberry dried fruit powder having a moisture content of less than 5% by weight and xylitol powder are blended in a ratio of about 60:40 by weight, and added to gum base, and mixed with other ingredients to yield a stick chewing gum composition with a 60:40 mixture of fruit to xylitol content of 30% by weight of the chewing gum composition.

In an aspect of the invention, the dried fruit powder employed in the chewing gum composition is seedless. Examples of dried fruit powders that do not contain seeds are apples, mangos, bananas, and lemon. Seedless cultivars of pineapples and watermelon are also commercially available. Seedless dried fruit powders can be used in a range of about 15% to about 80% by weight, about 30% to about 70%, and from about 40% to about 60% by weight of the chewing gum composition.

One of the benefits of Applicant's invention is that the natural fruit sugars of the dried fruit powder provide a pleasant taste that is reminiscent of the ripe or fresh fruit from which it was obtained. Examples of natural sugar blends from fruit include combinations of fructose, glucose and sucrose. For example, in the case of apple, the predominate sugar is fructose followed by glucose; sucrose representing about 20% of the total sugars. Grapes have a similar ratio of fructose to glucose and sucrose is only 1% of the total sugars. Fructose is sometimes referred to as fruit sugar in the trade and is considerably sweeter than sucrose, approximately 70% more sweet.

Another benefit of the dried fruit powders are the natural fruit flavors that are present. These flavors enhance the gum chewing experience and provide the consumer a more natural fruit flavor. Examples of the natural flavors are apple, strawberry, banana, mango, cranberry, blackberry, raspberry and lemon.

Natural acids present in the fruit powder provide yet another additional sensory benefit. These acids, in combination with the natural flavor and sweeteners provided by the dried fruit powder, offer a true fruit experience to the consumer. Examples of natural acids include citric acid, malic acid and tartaric acid. The malic acid present in dried apple, along with the natural apple flavor, creates a real apple flavor in gum using dried fruit powder as a bulking agent. Similarly, the citric acid present in dried lemon aids in providing a real lemon experience.

In another aspect of the invention, dried vegetable powders may also be used. Applicants made chewing gums containing carrot, corn, and potato powders. Examples of each are reflected below in Table 4.

TABLE 4

| Ingredient | Control | Example 8 | Example 9 | Example 10 |
|---|---|---|---|---|
| Sorbitol powder | 46.0 | — | — | — |
| Carrot powder | — | 39.9 | — | — |
| Corn supersweet powder | — | — | 40.9 | — |
| Potato powder | — | — | — | 40.9 |
| Base | 32.0 | 44.6 | 44.6 | 44.6 |
| Sorbitol syrup | 9.1 | — | — | — |
| Glycerin | 9.4 | 12.0 | 12.0 | 12.0 |
| Acetylated monoglycerides | 1.5 | 1.5 | 1.5 | 1.5 |
| Sweetener | 1.0 | 1.0 | 1.0 | 1.0 |
| Carrot flavor (liquid) | 1.0 | 1.0 | — | — |
| Total | 100 | 100 | 100 | 100 |

The dried vegetable powders used herein are also low in water content, typically containing less than 12% by weight, less than 9% by weight, and less than 6% by weight. A variety of drying methods may be employed to provide a dried vegetable powder as described previously above. Since most vegetable powders lack the sugars and acids of dried fruit powders, they are not as appealing to use as a replacement to sweet bulking agents. Nevertheless, dried vegetable powders may also be included to create a unique taste, decrease cost, or provide nutritional benefits inherent to the vegetable itself. For example, a dried vegetable powder such as potato powder may be combined with a strawberry powder. In an aspect of the invention, a chewing gum containing dried fruit powder is provided which also contains at least 1% by weight of dried vegetable powder.

Chewing gum base is typically composed of elastomers, softeners, emulsifiers, fillers, waxes and fats. Gum base typically accounts for 5% to 95% of the gum formulation. Gum bases may be natural or synthetic, and used alone, or in any combination. Examples of elastomers used in gum base include styrene butadiene and polyisobutylene. Softeners include triacetin, medium chain triglyceride, mono- and di-glycerides and acetylated mono-glycerides. Fillers are typically calcium carbonate and talc. Waxes are petroleum based and could be either paraffin wax or microcrystalline wax. Fats are typically hydrogenated oils, such as soybean.

In general, natural gum bases contain natural elastomers and natural waxes. Natural elastomers include but are not limited to latexes, vegetable gums such as chicle, spruce gum, and mastic gum, alone or in any combination; natural waxes include but are not limited to paraffin wax and beeswax, alone or in any combination. In another aspect of the invention, the chewing gum containing dried fruit powder contains at least 1% of a natural gum base. Combinations of natural gum base and synthetic gum base may also be used.

Low base chewing gums having a base content of less than 20% by weight, less than 15% by weight, less than 10% by weight, or less than 5% by weight will have a dried fruit powder content of at least 10% by weight. Preferably, the fruit powder employed has a fruit concentration of at least 30%, at least 50%, at least 70%, at least 90%, or more by weight of the dried fruit powder.

Gum is typically flavored with natural or synthetic flavors. Some of the natural flavors include mint and extracts from various plants and fruits. Synthetic flavors contain similar molecules to their natural counterparts, but are derived through various chemical processing technologies.

Chewing gums of the present invention are made by mixing the gum ingredients, followed by sheeting and forming into the desired shape, including but not limiting sticks, tabs or pellets. High intensity sweeteners are often included to provide a higher sweetness level. Examples of such sweeteners are aspartame, sodium saccharin, acesulfame-K, sucralose, stevia and rebaudioside sweeteners, luo han guo, advantame, monatin, brazzein and others. These sweeteners may be encapsulated to provide longer sweetness duration or protection in various polymer, hydrocolloid, cellulosic and other encapsulation matrices known to the industry.

Gum formulations, particularly fruit gums, often contain food acids to enhance the flavor perception. Common acids used in gum include citric acid, malic acid, tartaric acid, adipic acid and other acids found in fruits and vegetables.

I. Data

Applicants made chewing gums and conducted sensory testing wherein sorbitol powder (bulking agent) was replaced with 100% freeze dried apple powder having a fruit concentration of 100% in a stick chewing gum. Table 5 below shows the chewing gums produced and tested:

TABLE 5

| Ingredient | Control | Apple Powder Gum (Example 11) |
|---|---|---|
| Sorbitol powder | 46.75 | — |
| Apple powder (fruit concentration of 100%) | — | 53.25 |
| Gum Base | 32.0 | 32.0 |
| Sorbitol syrup | 9.1 | — |
| Glycerin | 9.4 | 12.0 |
| Malic acid | 0.25 | 0.25 |
| Citric acid | 0.5 | 0.5 |
| High intensity sweetener | 1.0 | 1.0 |
| Apple flavor | 1.0 | 1.0 |
| Total | 100 | 100 |

Figure 2:
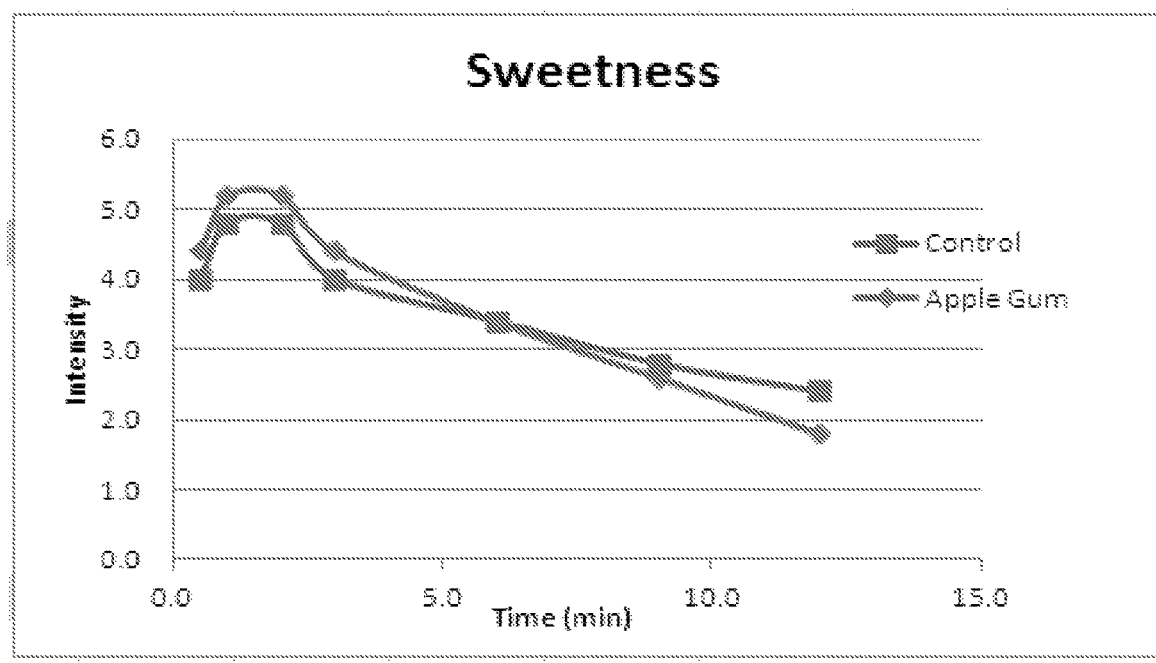
FIG. 2 is an illustration of the results from the sweetness profile of control vs. dried apple powder gum (100% of bulking agent).

The panelists chewed both the control and Example 11 for 12 minutes each and rated the intensity of flavor and sweetness from 0 to 9, with 0 being no flavor or sweetness to 9 being the highest flavor or sweetness. The results are illustrated in FIGS. 1 and 2.

The results show (FIGS. 1 and 2) that full replacement of the sweet bulking agent, sorbitol, with 53.25% dried apple powder provided more intense apple flavor, and a sweetness profile similar to the control for the duration of the chew.

In another experiment, Applicants tested the effect of the purity of the dried fruit powder using dried apple powder. Two samples were made, wherein the concentration of the fruit in the fruit powder was 100% (produced by cold spray-drying) and 30% (produced by low temperature spray-drying), respectively. Chewing gums were tested for flavor intensity and sweetness. Table 6 below shows the chewing gums tested.

TABLE 6

| Ingredient | Control | 100% Apple powder (Example 12) | 30% Apple powder, 70% maltodextrin (Example 13) |
|---|---|---|---|
| Apple powder (fruit concentration of 100%) | — | 38.5 | — |
| Apple powder (fruit concentration of 30%) | — | — | 38.5 |
| Sorbitol | 44.6 | — | — |
| Gum Base | 32.0 | 44.6 | 44.6 |
| Sorbitol syrup | 5.65 | — | — |
| Glycerin | 9.35 | 12 | 12 |
| Malic acid | 0.8 | 0.8 | 0.8 |
| Citric acid | 0.6 | 0.6 | 0.6 |
| Acetylated monoglycerides | 1.5 | 1.5 | 1.5 |
| High intensity sweetener | 1.0 | 1.0 | 1.0 |
| Apple flavor | 1.0 | 1.0 | 1.0 |
| Total | 100 | 100 | 100 |

The protocol for the sensory tests conducted comprised 6 panelists, trained in evaluating chewing gum samples. The samples were blind tested in random order. The panelists chewed the control and examples 12 and 13 for 12 minutes each and rated the intensity of flavor and sweetness from 0 to 9, with 0 being no flavor or sweetness to 9 being the highest flavor or sweetness. The results are illustrated in FIGS. 3 and 4.

Figure 3:
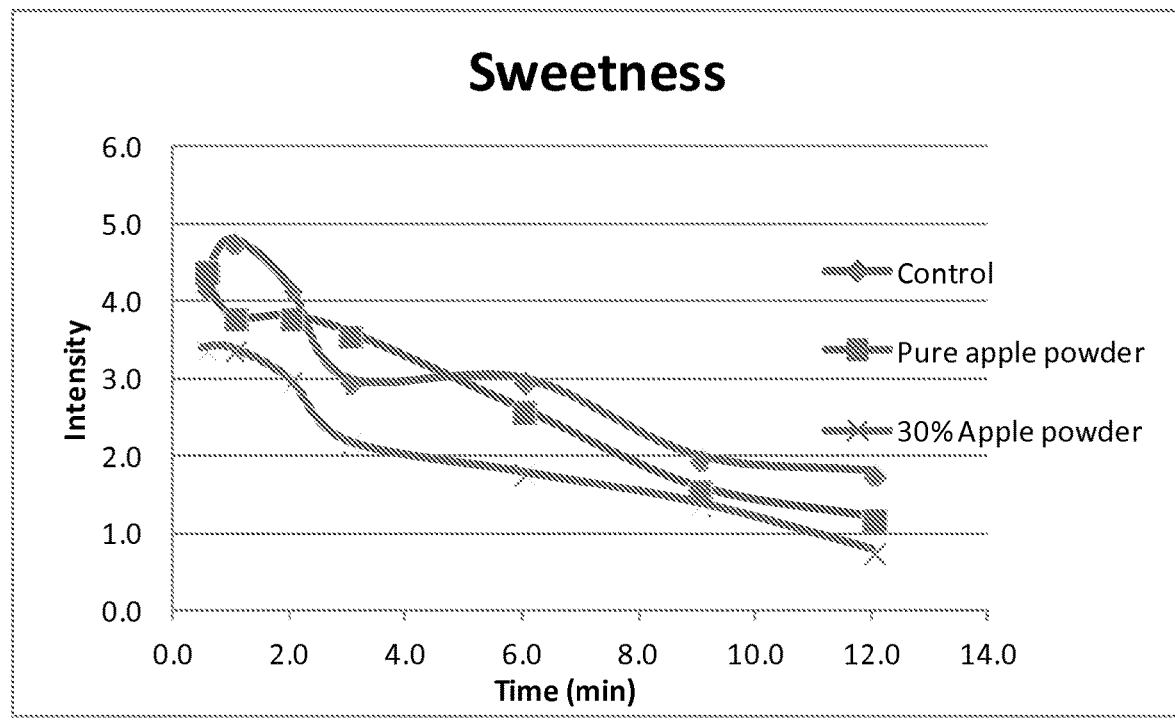
FIG. 3 is an illustration of the results from the effect of fruit concentration of fruit powder using dried apple powder (100%, 30%, and control).
Figure 4:
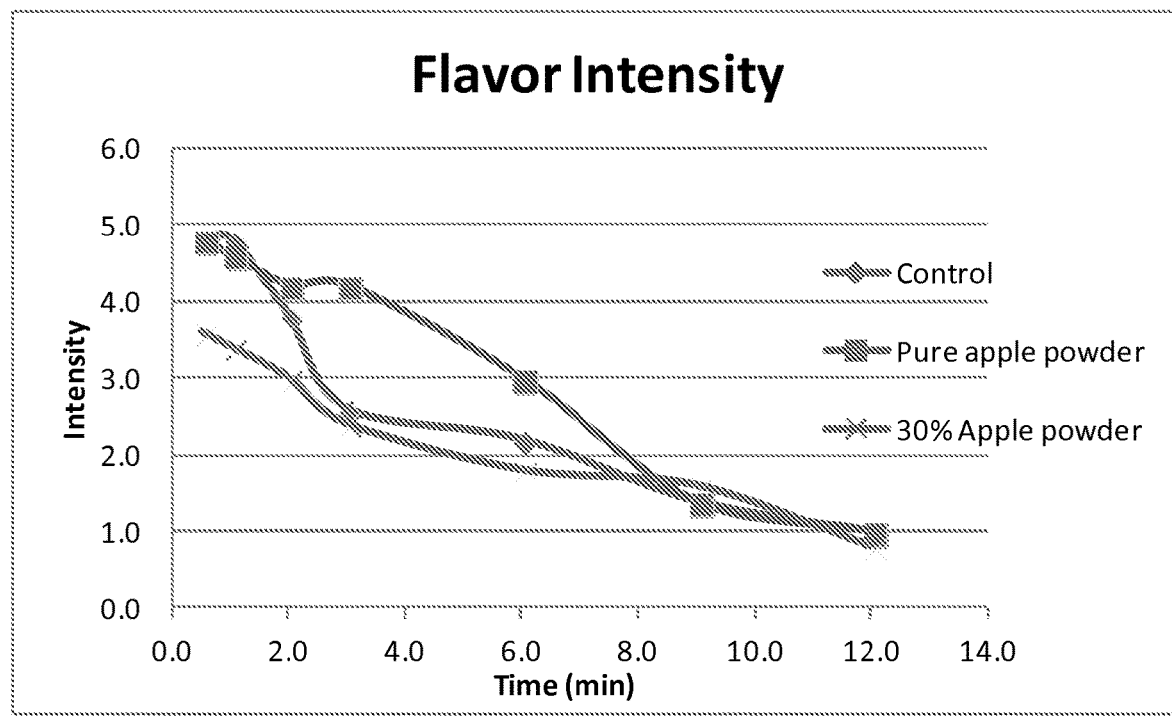
FIG. 4 is an illustration of the results from the effect of fruit concentration of fruit powder using dried apple powder (100%, 30%, and control).

FIGS. 3 and 4 further illustrate that Applicants found 30% apple powder (with 70% added maltodextrin) gave relatively low flavor and sweetness intensity than 100% apple powder. Purity (concentration) of the fruit powder employed can impact both sweetness and flavor intensity of the chewing gum composition.

Figure 5:
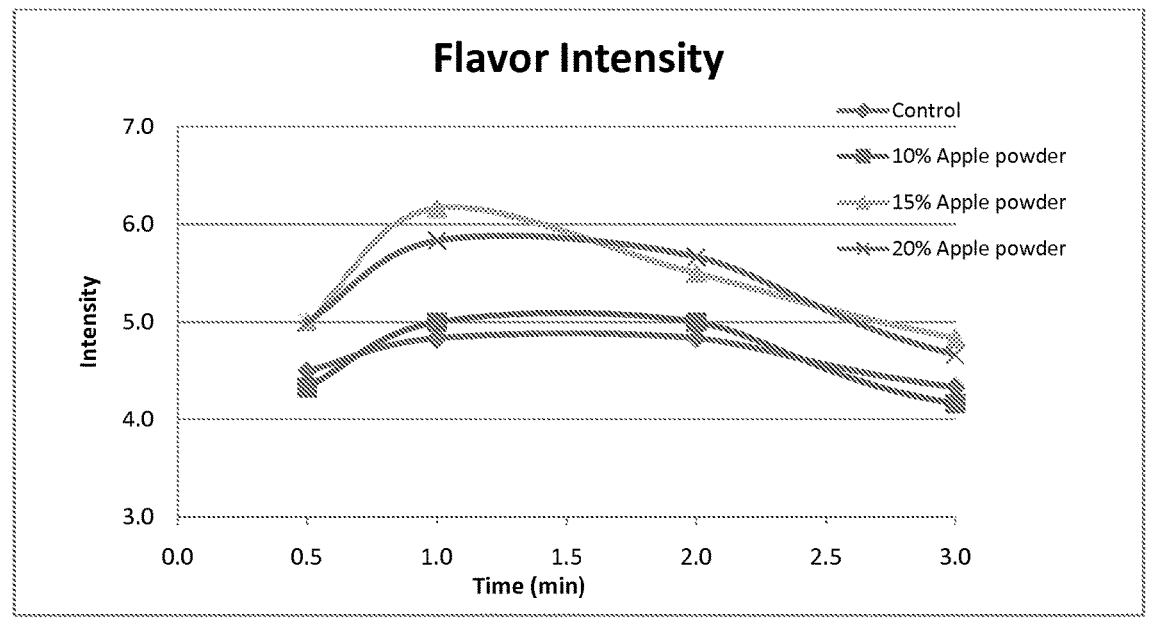
FIG. 5 is an illustration of the results from the protocol for the sensory tests conducted for flavor intensity.
Figure 6:
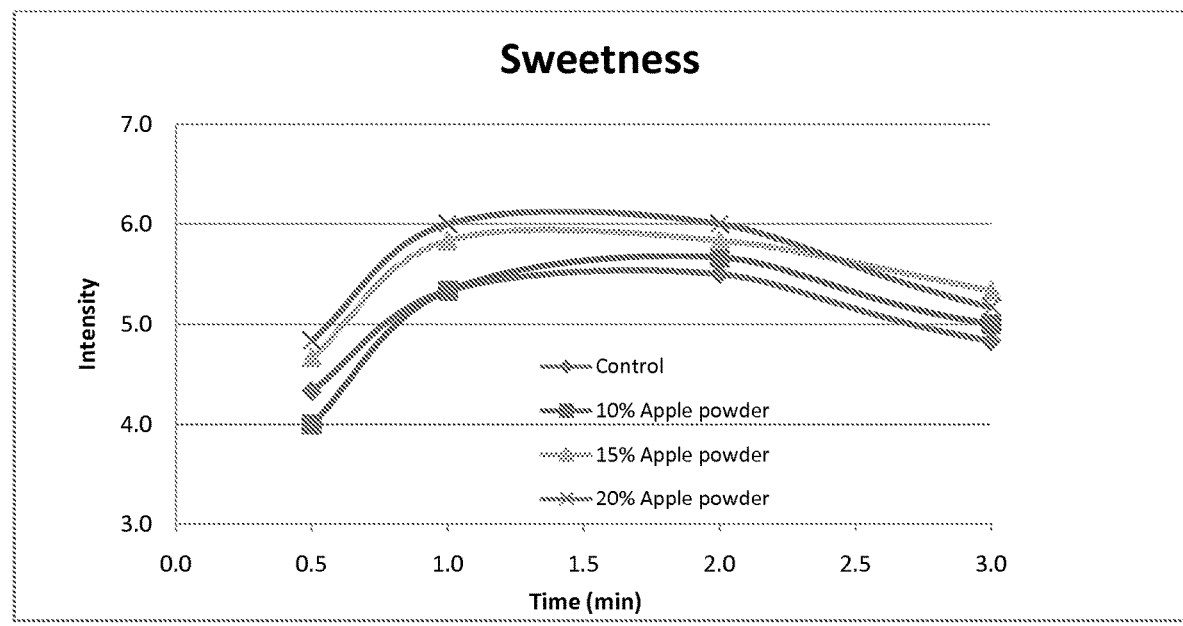
FIG. 6 is an illustration of the of the results from the protocol for the sensory tests conducted for sweetness intensity.

Applicants also tested the level of fruit powder most suitable for use in a chewing gum composition. The protocol for the sensory tests conducted comprised 6 panelists, trained in evaluating chewing gum samples. All the chewing gums of Table 7 were blind tested in random order. The panelists chewed the samples in the early chew (0.5-3 min.) and rated the intensity of flavor and sweetness from 0 to 9, with 0 being no flavor or sweetness to 9 being the highest flavor or sweetness. The results are illustrated in FIGS. 5 and 6.

TABLE 7

| Ingredient | Control | 10% Apple powder (Example 14) | 15% Apple powder (Example 15) | 20% Apple powder (Example 16) |
|---|---|---|---|---|
| Sorbitol | 46.75 | 36.75 | 31.75 | 26.75 |
| Apple powder (fruit concentration >95%) | — | 10.0 | 15.0 | 20.0 |
| Base | 32.0 | 32.0 | 32.0 | 32.0 |
| Sorbitol syrup | 9.1 | 9.1 | 9.1 | 9.1 |
| Glycerin | 9.4 | 9.4 | 9.4 | 9.4 |
| Malic acid | 0.25 | 0.25 | 0.25 | 0.25 |
| Citric acid | 0.5 | 0.5 | 0.5 | 0.5 |
| High intensity sweetener | 1.0 | 1.0 | 1.0 | 1.0 |
| Apple flavor | 1.0 | 1.0 | 1.0 | 1.0 |
| Total | 100 | 100 | 100 | 100 |

Example 14 (chewing gum with 10% fruit powder) showed similar flavor and sweet intensity to control. However, Examples 15 & 16 (chewing gums with 15% and 20% fruit powder, respectively) showed better flavor and sweetness perception. The data demonstrates that chewing gums with at least 15% by weight dried fruit provides enhanced flavor perception.

The present invention is not limited to the above embodiments and can be variously modified. The above description of the preferred embodiments, including the Examples, is intended only to acquaint others skilled in the art with the invention, its principles, and its practical application so that others skilled in the art may adapt and apply the invention in its numerous forms, as may be best suited to the requirements of a particular use.

With reference to the use of the word(s) comprise or comprises or comprising in this entire specification (including the claims below), unless the context requires otherwise, those words are used on the basis and clear understanding that they are to be interpreted inclusively, rather than exclusively, and applicants intend each of those words to be so interpreted in construing this entire specification.

What is claimed is:

1. A chewing gum composition comprising:
   a) less than 10% by weight sweet bulking agent selected from the group consisting of sugar bulking agents, polyols, and combinations thereof; and
   b) at least 60% by weight dried fruit powder, wherein the dried fruit powder has a fruit concentration of at least 85% by weight;
   wherein the dried fruit powder is selected from the group consisting of apple, banana, pineapple, mango, kiwifruit, guava, lemon, orange, and watermelon.

2. A composition of claim 1 further comprising at least 1% by weight dried vegetable powder selected from the group consisting of carrot, corn, potato powders, and combinations thereof.

3. A method of excluding sweet bulking agents in a chewing gum composition, wherein the sweet bulking agents are selected from the group consisting of sugar, polyols, and combinations thereof, the method comprising incorporating dried fruit powders into the chewing gum composition in an amount of at least 40% by weight of the chewing gum composition, wherein the dried fruit powder has a fruit concentration of at least 85% by weight, thereby replacing the sweet bulking agents by 100% by weight of the chewing gum composition, and wherein the dried fruit powder is selected from the group consisting of apple, banana, pineapple, mango, kiwifruit, guava, lemon, orange, and watermelon.

4. A method of claim 3 wherein the amount of dried fruit powder is no more than 90% by weight of the chewing gum composition.

5. A method of claim 3 wherein the chewing gum contains less than 20% by weight gum base.

6. A method of claim 3 wherein the chewing gum contains less than 15% by weight gum base.

7. A method of claim 3 wherein the dried fruit powder has a fruit concentration of at least 90%.

8. A chewing gum composition comprising 0% by weight sweet bulking agent selected from the group consisting of sugar bulking agents, polyols, and combinations thereof; and at least 60% by weight dried fruit powder, wherein the dried fruit powder has a fruit concentration of at least 85% by weight, and wherein the dried fruit powder is selected from the group consisting of apple, banana, pineapple, mango, kiwifruit, guava, lemon, orange, and watermelon.

9. A chewing gum composition comprising:
   a) at least 40% by weight of a seedless dried fruit powder, wherein the seedless dried fruit powder has a fruit concentration of at least 30% by weight; and
   b) a gum base content of at least 25% by weight of the chewing gum composition;
   wherein the seedless dried fruit powder is selected from the group consisting of apple, mango, banana, lemon, pineapple, and watermelon dried fruit powder.

10. A composition of claim 9, comprising at least 60% by weight of the seedless dried fruit powder.

* * * * *